Aug. 4, 1964 W. TENNANT 3,143,434
METHOD AND APPARATUS FOR PRODUCING PERFORATED ADHESIVE MATERIAL
Filed Feb. 20, 1956 2 Sheets-Sheet 1

Inventor
WILFRED TENNANT by Hill, Sherman, Meroni, Gross & Simpson Attys.

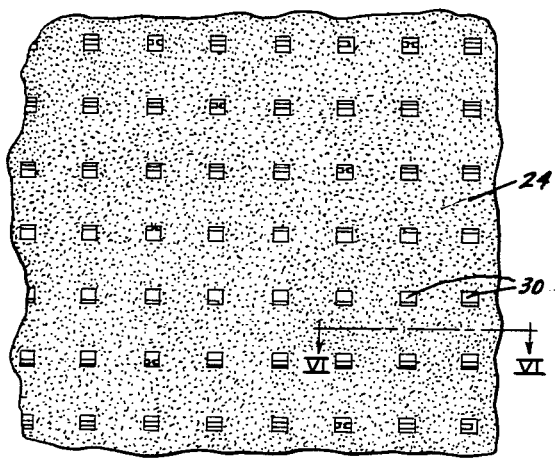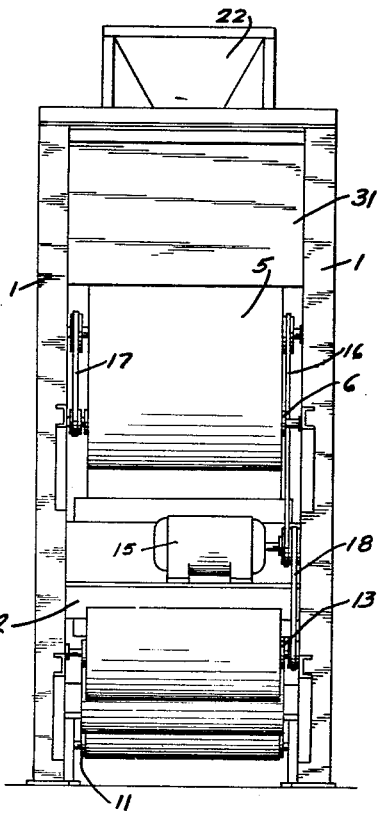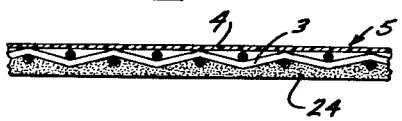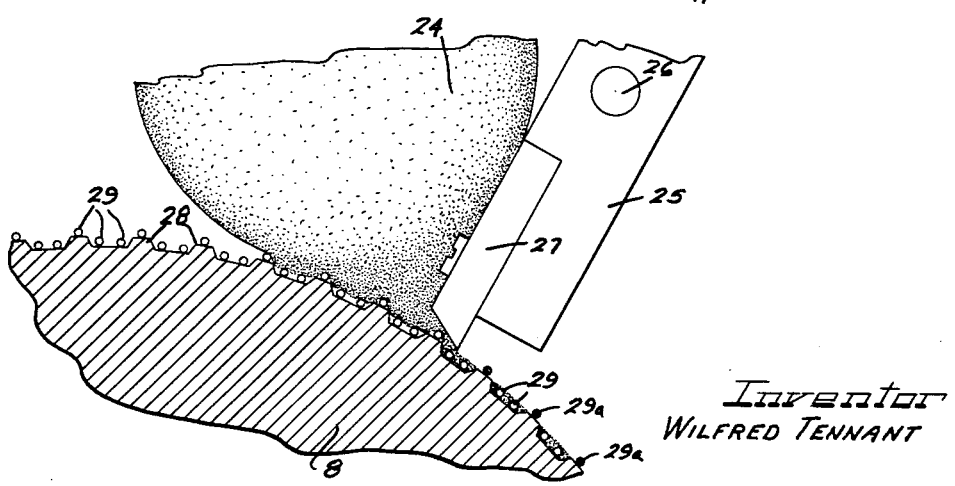

United States Patent Office 3,143,434
Patented Aug. 4, 1964

3,143,434
METHOD AND APPARATUS FOR PRODUCING PERFORATED ADHESIVE MATERIAL
Wilfred Tennant, Hythe, near Southampton, England, assignor to The Scholl Mfg. Co., Inc., Chicago, Ill., a corporation of New York
Filed Feb. 20, 1956, Ser. No. 566,685
Claims priority, application Great Britain June 27, 1955
6 Claims. (Cl. 117—4)

This invention relates to improvements in a method of and apparatus for making adhesive material, and also to a new and novel adhesive material, the apparatus being highly desirable for the manufacture of medical and surgical adhesive tape, bandages, pads, and the like, although adhesive materials for industrial and commercial usages may also be provided, as will be apparent to one skilled in the art.

Great irritation and suffering has been caused patients by the application to the human body of adhesive tape, bandages, plasters, and the like, as these devices were made in the past. Where the adhesive tape or bandage was non-porous, and in many cases waterproof, moisture cannot escape from the covered parts of the body, and the covered skin becomes irritated and deteriorates, and if a wound is covered by the tape or bandage, some of the skin deteriorates around the wound, and the wound remains moist which retards the natural healing process of the body. Where a person has skin sensitive to the application of adhesive tape for a period of time, with tape of the character heretofore known the skin frequently broke out in open and painful sores beneath the bandages.

While attempts have been made in the past to produce porous adhesive tapes in an endeavor to permit the body to breath through the bandage, and thus lessen the irritation, the tapes were not waterproof and should they become wetted, the patient is extremely uncomfortable. Also, in the making of porous adhesive tape heretofore, various methods have been attempted but have proven objectionable in many respects. In many cases these methods included the application of the adhesive mass in spaced locations to a porous backing material, but a porous backing material is usually not waterproof. Attempts have also been made to perforate the backing material and adhesive mass, but extreme difficulty has been experienced in adequately perforating the backing material during manufacture due to the flexibility of the material, and again the perforations resulted in providing non-waterproof tape or bandage. Also, in previous attempts to provide porous adhesive tape, in most cases the type of backing material utilized was limited, whereas it has now become desirable to make adhesive tapes and bandages of numerous backing materials including fabrics, plastic films or sheets, combinations of both, etc.

With the foregoing in mind, it is an important object of the instant invention to provide apparatus for and a method of making adhesive tape that is not only water or liquidproof, but vapor porous, the product being such that if water or other liquid is poured over the bandage when applied to the body, the liquid will not pass through the bandage, but at the same time moisture accumulating under the bandage may evaporate through the bandage.

Another object of the invention is the provision of apparatus for and a method of making a liquidproof adhesive material that is vapor porous, and wherein substantially any desirable backing material may be utilized.

It is a further feature of the invention to provide apparatus for and the method of making adhesive material provided with numerous fine perforations whereby liquid will not pass through the material, but the material is vapor porous.

It is also a feature of this invention to provide apparatus for the making of adhesive material, which apparatus supplies the adhesive to a backing member in predetermined pattern form, and also perforates or pierces a backing member in numerous locations between the spots of applied adhesive in a manner to render the backing member water impervious but vapor porous.

While some of the more salient features, characteristics and advantages of the instant invention have been above pointed out, others will become apparent from the following disclosures, taken in conjunction with the accompanying drawings, in which—

FIGURE 3 is an end elevational view of the machine taken substantially as indicated by the line III—III of FIG. 2;

FIGURE 4 is a fragmentary and greatly magnified showing, partially in elevation and partially in section, illustrating the structure in the upper portion of FIG. 1 exposed by the parts broken away;

FIGURE 5 is a fragmentary greatly magnified face view of the resultant adhesive material, showing the adhesive side thereof; and FIGURE 6 is a fragmentary greatly magnified vertical sectional view through the material, taken substantially as indicated by the line VI—VI of FIG. 5.

As shown on the drawings:

Figure 1:
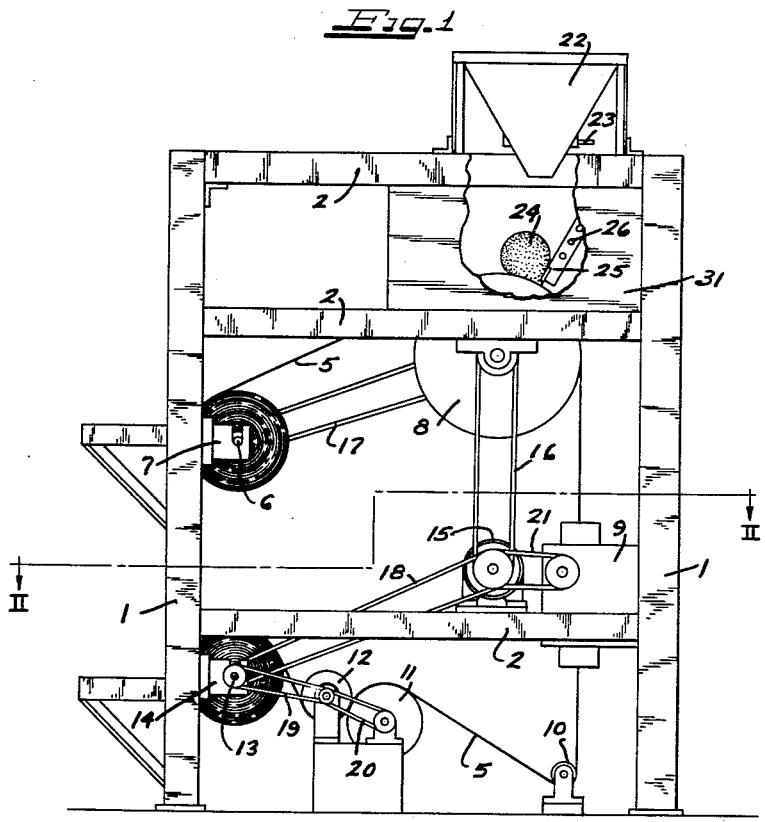
FIGURE 1 is a side elevational view of a machine embodying principles of the instant invention, with parts broken away to disclose structure therebehind.

The machine selected as an illustrative embodiment of the instant invention comprises a frame made up of corner posts 1, and lateral or cross supports 2 are secured to the posts 1 wherever needed. It will be understood, of course, that bearings are supplied for the various shafts and moving parts wherever necessary, these bearings being of standard construction and need not be specifically referred to herein. It should also be understood that while in the illustrated embodiment of the invention, the supply spool, the receiving spool, and the various rolls, with one exception, are all illustrated as power driven, certain of these may be idler rolls if so desired. It is preferable, however, to drive most of the rolls and the supply and receiving spools in order to maintain desired uniform tension and movement of the sheet or web passing through the machine during operation.

The instant machine handles a relatively wide web of backing material, and after manufacture the completed adhesive material may be cut into any desired sizes and shapes. The backing material utilized may be substantially any desired substance, a fabric, supported or unsupported plastic material in sheet or film form, such as nylon, polyethylene, polyvinyl chloride, or substantially any other suitable substance. In the illustrated instance, as seen in FIG. 6, by way of example there is shown a combination backing material embodying a coarsely woven textile fabric such as gauze 3, covered on one face by a film 4 of plastic substance rendering the backing material waterproof.

The adhesive utilized may be of rubber or rubber-like material such as polyisobutene, polyvinyl alkyl ethers, or the like, combined with suitable resins and softeners to form ultimately a pressure sensitive adhesive mixture. For example, a suitable resin may be colophony and a suitable softener is lanolin.

The web or elongated sheet 5 of backing material passes through the machine from a supply spool 6 mounted in a cradle 7, next passes over a large roll 8, thence through a refrigerating means 9, over a guide roll 10, thence partially around the circumference of each of a pair of offset rolls 11 and 12, and the finished product is wound on a receiving spool 13 cradled as at 14. It will be seen that with the structure illustrated, a supply spool may be inserted at the same end of the machine from which a fully wound receiving spool may be removed.

The machine may be driven by means of an electric motor 15 or equivalent power plant, and in the illustrated instance this motor drives the roll 8 through a belt and pulley arrangement 16, and the supply spool 6 may be driven through a belt 17 from the roll 8. In similar manner, the receiving spool may be driven from the motor by means of a belt 18, and the roll 12 may be driven from the supply spool shaft by a belt 19, and a belt 20 in turn drives the roll 11 from the shaft of the roll 12. At the same time, another belt connection 21 from the motor may drive the refrigerating apparatus 9.

As seen best in FIG. 1, a suitable hopper 22 for adhesive mass may be mounted on top of the frame, and provided with a valve element 23 diagrammatically illustrated, by means of which a gob 24 of adhesive mass may be dropped from the bottom of the hopper when necessary.

As seen in FIGS. 1 and 4, an inclined doctor blade 25 extends from the frame at an angle toward the roll 8. This doctor blade is preferably provided with heating means, such as electrical heating elements diagrammatically indicated at 26 to maintain it at an elevated temperature. This doctor blade is also provided with a knife edge 27 preferably made removable so that it can be resharpened or replaced when necessary. It will be noted that the knife edge 27 and doctor blade 25 approach the roller 8 in a location below the high point of the roll to thereby form with the roll a trough for the reception of the adhesive gob 24. At the start of operation, the end of the web 5 is first passed over the roll 8 and beneath the knife edge of the doctor blade, and then a gob 24 of adhesive is dropped on the web in the aforesaid trough.

With reference now to FIG. 4, it will be particularly noted that the roll 8 is provided over its entire outer surface with numerous spaced projections 28. These projections may be provided by knurling the surface of the roll, or in any other suitable manner and may have substantially any shape. The showing in FIG. 4 is greatly magnified, and therein the projections are illustrated as small pyramids having a slightly flattened top portion. These projections are preferably arranged in a predetermined pattern.

The surface of the roll 8 is maintained cold, either by chilling the roll, or, as illustrated, making it of such large size that a point on the roll passing the doctor blade will have ample time to cool before again reaching the adhesive gob 24. As stated above, the doctor blade is preferably maintained at an elevated temperature sufficient that the adhesive will not adhere thereto, and for most suitable adhesive materials, a temperature of 160° C. is sufficient.

In FIG. 4 an attempt has been made to illustrate the actual action between the roll 8 and the doctor blade as the web passes by. In this case, the circles 29 illustrate transverse threads of the backing web 5, the waterproof film 4 having been eliminated for purposes of clarity. It will be noted that the web is trained over the roll 8 so as to tightly engage the roll in the region of adhesive application, and the web will then follow the actual contour or surface configuration of the roll, so that certain of the strands 29 will be on top of the projections 28, while other strands will occupy the valleys between those projections. It will be especially noted that the knife edge 27 is positioned in such proximity to the roll that it substantially contacts the tops or crests of the projections 28. Consequently, when the sheet or web 5 passes under the knife edge 27, the adhesive which adheres to the cold web is doctored into depressions in the web corresponding to the valleys between the projections 28 on the roll, and the web is actually perforated or pierced as each projection passes under the knife edge, so that some of the threads of the web will actually be cut through as indicated at 29a. These perforations or apertures in the web are sufficiently fine as to preclude the passage of water therethrough, but at the same time will permit evaporation of vapors therethrough. The applied adhesive will remain in the locations corresponding to the valleys between the projections on the roll 8 by virtue of partial setting against the cold surface of the roll, and will not tend to flow over and cover the perforations.

In FIG. 5 I have endeavored to illustrate in greatly magnified style the adhesive face of the resultant material, and it will be noted that the perforations 30 provided as above explained are not strictly uniform in character, but some contain broken threads, others may have a complete thread thereover, etc., owing to the somewhat abrading action occurring between the knife edge 27 and the projections on the roll 8. In fact, non-uniformity of perforations is preferable rather than a disadvantage, in that it permits vaporization of moisture occurring beneath an applied piece of material and yet, the resultant tape or bandage is more waterproof than would be the case if the perforations were strictly even in cut.

The zone of application of adhesive to the web 5 is preferably enclosed or shielded by a housing 31 to maintain the adhesive clean and in a state of even consistency.

While it is possible to permit the adhesive to fully cure by mere exposure to air, that process requires an objectionable length of time. In order to expedite the process, after leaving the roll 8 the web is passed through a refrigerating apparatus 9 which is preferably in the form of an enclosed refrigerating chamber maintained cool in any suitable known manner by commonly used refrigerating mechanism.

Figure 2:
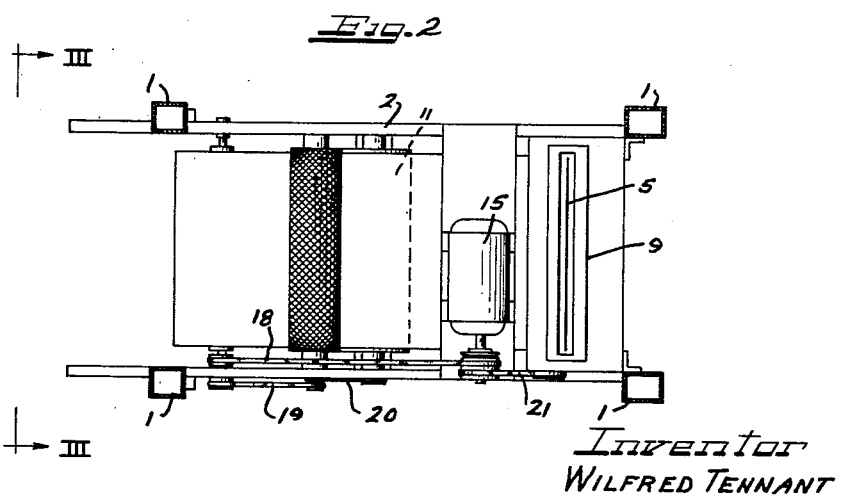
FIGURE 2 is a plan sectional view of the structure of FIG. 1, taken substantially as indicated by the line II—II of FIG. 1, looking in the direction of the arrows.

The web then passes over the guide roll 10, and enters the nip between the offset rolls 11 and 12. It will be noted from the showing in FIG. 2 that the roll 12 preferably has a knurled surface in order to better grip the web, and the web preferably passes around substantially half the circumference of this roll. This roll is also driven with a surface speed roughly about 5% faster than that of the roll 11 so that it will exert a pull on the web and tension the same to some extent. The real feed pull upon the web is therefore imparted by the rolls 11 and 12, and the web is fed to the supply spool 13 in an unstretched condition. This roll 12 is also so arranged, such as by slightly crowning the same or the like, to extend the web laterally without stretching the same so as to insure an even winding of the finished material on the receiving spool 13.

Reviewing the operation of the machine briefly, it will be seen that the web passes over the roll 8 bearing the numerous projections on its surface, fits the configuration in the surface of that roll, and receives the adhesive applied in a predetermined pattern with the adhesive occupying locations corresponding to the valleys between the projections on the roll. At the same time, by virtue of the engagement between the projections and the knife edge 27, the web is perforated minutely between the adhesive spots thereon. The cold surface of the roll 8 cures the adhesive sufficiently so that it will not flow and block the perforations in the web. Thereafter, curing of the adhesive is expedited by the refrigerating apparatus 9, and the web in its continued movement is stretched, flattened and leveled, by the rolls 11 and 12 so that it is wound on the receiving spool 13 in an unstretched and perfectly flat smooth condition. The operation of the machine is continuous once it is started, and should the gob 24 of adhesive material be used up before the web, it is a simple expedient to place more adhesive in position.

The adhesive material is water impervious and yet vapor porous and may be cut into any desired size and shape, from tiny little patches to complete large size plasters.

From the foregoing, it is apparent that I have provided a machine economical in construction, and economical to operate for substantially continuous manufacture of adhesive material. The machine requires little servicing, it only being necessary periodically to sharpen the knife edge 27, and eventually to replace it with a new one. My novel method of making adhesive tape is believed sufficiently apparent from the foregoing so as to warrant no further description herein.

It will be understood that modifications and variations may be effected without departing from the scope of the novel concepts of the present invention.

I claim as my invention:

1. In an adhesive material making machine, a backing roll having numerous spaced and blunted projections on the surface thereof, a fixed doctor blade in proximity to said roll and having a knife edge thereon, means to feed a web of backing material between the roll and doctor blade, means to supply adhesive to said backing material in advance of said blade, and said blade being sufficiently close to said roll that said projections force the backing material against said knife blade and abrade apertures in the backing material and cause distribution of the adhesive into the valleys between the projections.

2. In an adhesive material making machine, means to feed a web of backing material along a predetermined path, a backing roll having numerous spaced projections on the surface thereof and over which the web passes, said projections being slightly flattened at the tops thereof, means to drive said roll, a fixed knife-edged doctor blade mounted sufficiently close to said roll that said projections substantially contact the knife edge of said blade, whereby said backing material is perforated by such contact, means to supply adhesive to said backing material in advance of said blade, and said projections being of such size that the perforations provided will pass vapor but not liquid in the normal use of the material.

3. In an adhesive material making machine, means to feed a web of backing material along a predetermined path, a backing roll having numerous spaced projections on the surface thereof and over which the web passes, means to drive said roll, a fixed knife-edged doctor blade mounted sufficiently close to said roll that said projections substantially contact the knife edge of said blade, whereby said backing material is perforated by such contact, and means to supply adhesive to said backing materials in advance of said blade, and heating means associated directly with said doctor blade, said roll being cold to insure adhesive staying on said web in locations corresponding to the valleys between projections on said roll.

4. In an adhesive material making machine, a backing roll, means to drive said roll, an inclined doctor blade extending toward the surface of said roll and fixed in a location following the maximum height of the roll to form with the roll a trough for a supply of adhesive mass, means to feed a web of backing material over said roll and beneath said blade, numerous spaced projections on the surface of said roll, and a knife edge on said blade positioned to substantially contact the projections on said roll and disrupt said web and the adhesive spread thereon to provide apertures in the finished material.

5. The method of making adhesive material with the aid of a roll having numerous blunted projections thereon and a knife-edged doctor blade, including the steps of feeding a web of backing material over said roll and beneath said blade, applying adhesive to said web, doctoring the adhesive onto said web in locations corresponding to the valleys between projections on the roll, and abrading the web between the projections and the blade to provide minute apertures in the web at the crests of the projections.

6. The method of making adhesive material with the aid of a roll having numerous spaced projections on the surface thereof, including the steps of feeding a web of backing material over said roll, applying adhesive to said web, contemporaneously doctoring the applied adhesive onto said web in locations corresponding to the valleys between projections on the roll and abrading the web over said projections to provide in the web numerous apertures of such size as to render the finished material vapor porous but substantially liquid impervious in normal use of the material.

References Cited in the file of this patent

UNITED STATES PATENTS

| | | |
|---|---|---|
| 84,483 | Earnshaw | Dec. 1, 1868 |
| 1,250,577 | Goldberg | Dec. 18, 1917 |
| 1,899,688 | Hill | Feb. 28, 1933 |
| 2,400,995 | Humphner | May 28, 1946 |
| 2,413,500 | Hummel | Dec. 31, 1946 |
| 2,646,771 | Salditt | July 28, 1953 |
| 2,647,065 | Scholl | July 28, 1953 |
| 2,795,521 | Blackford | June 11, 1957 |
| 2,798,820 | Nelson | July 9, 1957 |
| 2,817,596 | Schur | Dec. 24, 1957 |
| 2,819,180 | Koenig | Jan. 7, 1958 |
| 2,861,006 | Salditt | Nov. 18, 1958 |